No. 795,806. PATENTED AUG. 1, 1905.
C. ADELHELM.
SPRING MOTOR.
APPLICATION FILED NOV. 18, 1903.

3 SHEETS—SHEET 2.

Witnesses:
E. F. Wilson
F. Schlotfeld

Inventor:
Charles Adelhelm
By Rudolph [illegible]
Attorney.

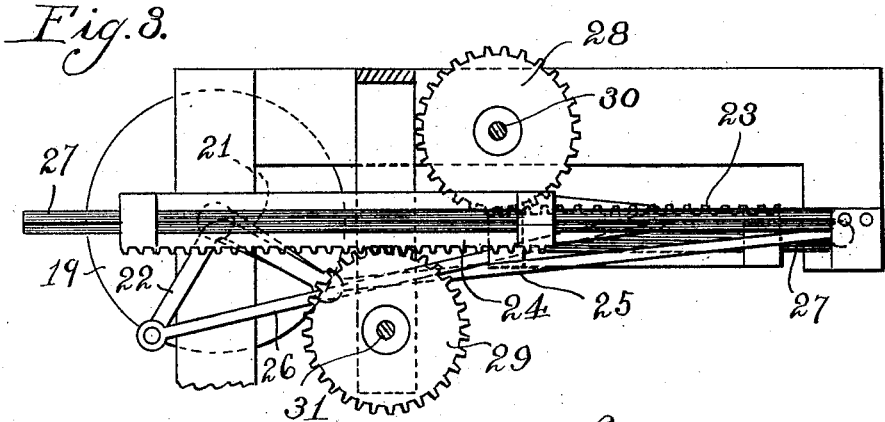
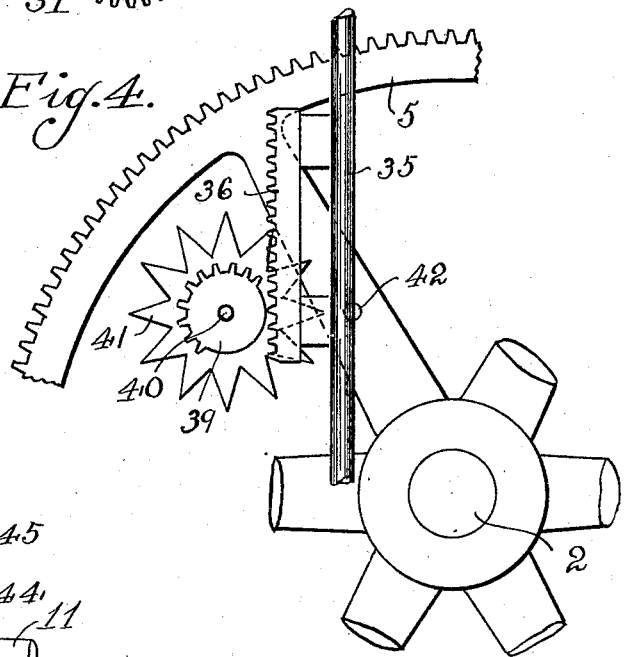
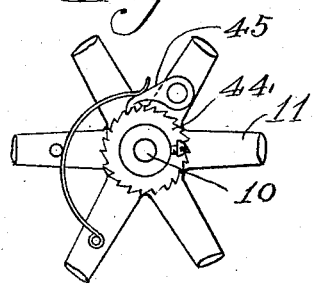
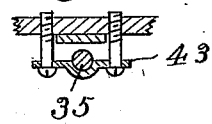

UNITED STATES PATENT OFFICE.

CHARLES ADELHELM, OF CHICAGO, ILLINOIS.

SPRING-MOTOR.

No. 795,806.  Specification of Letters Patent.  Patented Aug. 1, 1905.

Application filed November 18, 1903. Serial No. 181,678.

*To all whom it may concern:*

Be it known that I, CHARLES ADELHELM, a citizen of the United States, residing at Chicago, in the county of Cook and State of Illinois, have invented certain new and useful Improvements in Spring-Motors; and I do hereby declare the following to be a full, clear, and exact description of the invention, such as will enable others skilled in the art to which it appertains to make and use the same.

My invention relates to a novel construction in a spring-motor, the object being to provide a motor in which the stored power is exerted uniformly until the tension of the spring is relaxed to a given point and which is further governed to a uniform speed during its operation; and it consists in the features of construction and combinations of parts hereinafter fully described and claimed.

Figure 1:
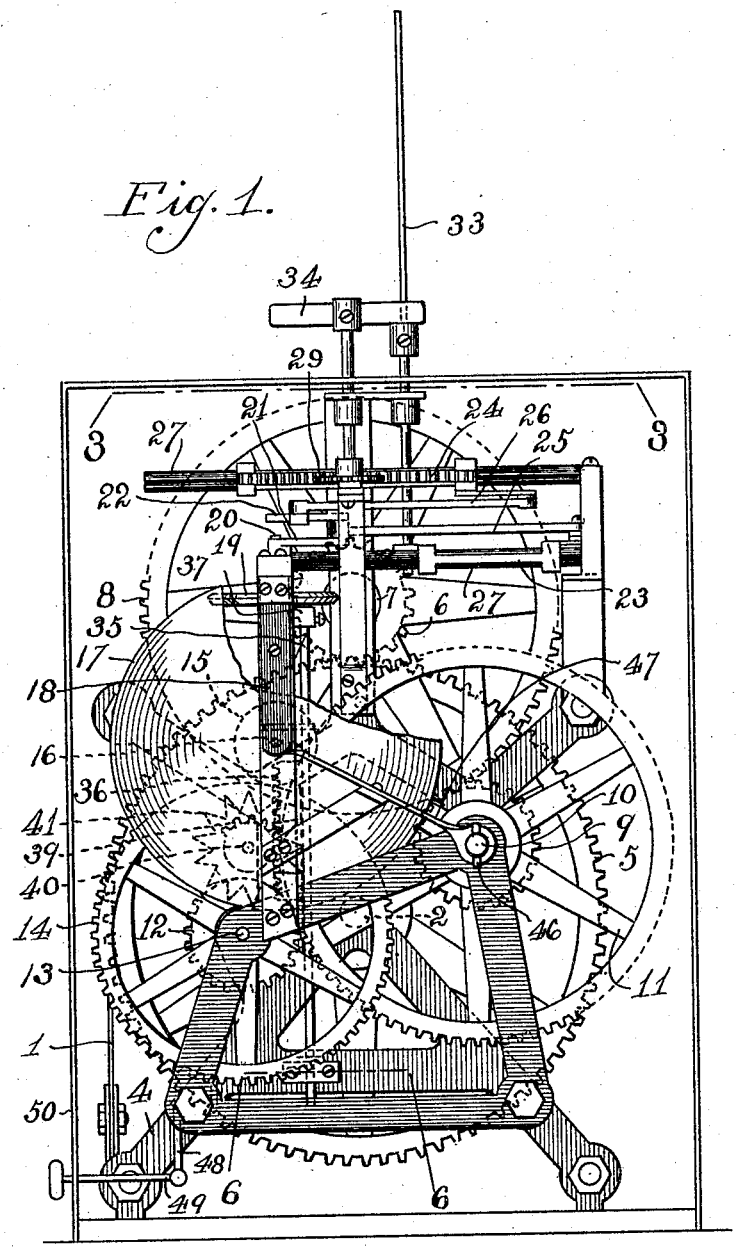
Figure 2:
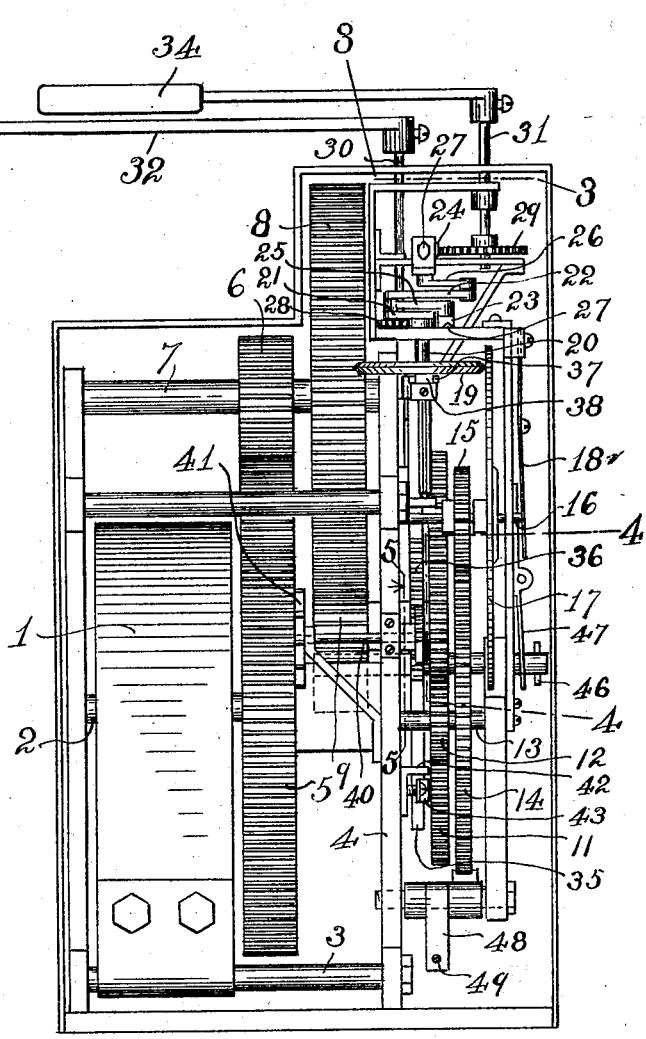

In the accompanying drawings, illustrating my invention, Figure 1 is a rear elevation of a motor constructed in accordance with my invention, the rear wall of the casing thereof being removed. Fig. 2 is a side elevation of my motor with the casing shown in section. Fig. 3 is a detail plan section on the line 3 3 of Figs. 1 and 2. Fig. 4 is a fragmentary detail section on the line 4 4 of Fig. 2. Fig. 5 is a fragmentary section on the line 5 5 of Fig. 2. Fig. 6 is a fragmentary section on the line 6 6 of Fig. 1.

Referring to said drawings, 1 indicates the spring, secured at one end to the drive-shaft 2 and at its other end to a part of the frame 4. Said shaft 2 carries a spur-gear 5, meshing with a pinion 6 on a counter-shaft 7, which in turn carries a large spur-gear 8, meshing with a pinion 9 on a second counter-shaft 10. The latter carries a large spur-gear 11, meshing with a pinion 12 on a third counter-shaft 13, and this carries a large spur-gear 14, meshing with a pinion 15 on a fourth counter-shaft 16. In this manner by means of the gearing described the counter-shaft from which the power is to be delivered is suitably geared to the drive-shaft, such gearing being varied according to the strength of the spring and the power required to be exerted by said counter-shaft. In the instance illustrated the said motor is used to actuate an oscillating fan, and accordingly I have shown and will describe a suitable driving mechanism and governor therefor. On said counter-shaft 16 is a friction-disk 17, which is held, by means of a spring 18, bearing on said shaft 16 at one end, in frictional contact with a small friction-wheel 19, mounted on a vertical shaft 20, on which it is longitudinally movable, but rotatably rigid. Said shaft 20 carries a double crank at its upper end, the arms 21 and 22 of which extend at angles of approximately ninety degrees to each other, said crank-arms being connected with two reciprocating racks 23 and 24 by means of pitmen 25 and 26. The said racks are longitudinally movable on guides 27, suitably supported on the frame, and mesh with the spur-gears 28 and 29, respectively, mounted on vertical rock-shafts 30 and 31, said shaft 30 carrying the stem 32 of the fan 33 and said shaft 31 carrying a counterweight 34, which acts as a governor to prevent jerky movement of the fan at the end of each stroke thereof. The crank 22, which transmits motion to said counterweight 34, is ninety degrees in advance of the crank 23, which operates said fan 33, and consequently said counterweight is at the middle of its movement when the fan is at the end of its stroke. The counterweight thus acts as a balance-wheel to absorb the momentum from said fan when it is stopping and give it out again when the fan is standing. Vertically movable in guides on the frame is a rod 35, which carries a rack 36 and at its upper end carries a fork 37, the two prongs or arms of which enter a circumferential groove 38 in the hub of said wheel 19 to impart longitudinal movement to the latter in accordance with the movements of said rod 35. Said rack 36 is adapted to mesh with a gear-pinion 39 on a horizontal shaft 40, on which is mounted a star-wheel 41, the points of which project into the path of a projection 42 on one of the spokes of the spur-gear 5, and by means of which said shaft 40 is partially turned at intervals. A number of the teeth of said pinion 39 are cut away, thereby making same equivalent to a segmental gear which is so arranged relatively to said rack as to turn free of same when the wheel 19 has been raised to the upper limit of its movement, in which position it engages said disk 17 adjacent its periphery. The said rod 35 passes at its lower end through the guide 42 and is engaged by an adjustable friction-plate 43, mounted on the frame 4, said plate serving to prevent free movement of said rod and support the latter in the position in which it is moved by said rack and pinion. The said spur-gear 11 is loosely mounted on said counter-shaft 10, while the pinion 9 is rigid therewith and with a ratchet-wheel 44, interposed between said pinion 9 and gear 11 and which is engaged by a spring-actuated pawl 45 on said spur-gear 11. Said shaft 10 is adapted in any suitable manner, such as by the pins 46, to receive a key or other device to turn said shaft to wind up said spring 1 through the intermediacy of the spur-gear 8, pinion 6, and spur-gear 5. When said shaft 10 is turned to wind up the spring, the shaft 2 is obviously turned in the same direction and by means of the projection 42 thereon the star-wheel 41 is partially revolved at each revolution of said gear 5, thereby raising the friction-wheel 19, as will be obvious. Should the latter be held in close engagement with the disk 17 during this time, it would obviously render such shifting difficult, and to avoid undue friction during this movement I provide a lever 47, which is pivotally mounted between its ends on a part of the frame and at its ends project, respectively, underneath the spring 18 and in the path of the key or other winding device, so that as the latter is inserted over said shaft 10 said lever 47 will be turned and will force the spring 18 out of engagement with the end of said shaft 16, thereby releasing the pressure of the disk 17 on the friction-wheel 19. In winding up said spring 1 to the proper tension the wheel 5 makes a given number of turns, depending upon the length of said spring 1. For purposes of description we will assume that the number of revolutions imparted to said wheel 5 to wind up said spring and imparted thereto by the spring in the reverse direction is eight. Then the rack 36 and pinion 39 are relatively so set that during the first four or five revolutions of said wheel 5 in winding up said spring the wheel 19 will be raised to the position shown in Figs. 1 and 2 and will remain in such position during the remaining three or four revolutions required to complete the winding. Upon setting the motor in operation the greatest power of said spring 1 will be exerted during the first three or four revolutions imparted to the shaft 2, and during this period said fan will be actuated at a uniform speed. As said spring gradually loses its tension, however, its power obviously lessens, and consequently if the speed-gearing between the same and said fan or other device operated from said motor is not varied to equalize the loss of tension the result must be a reduction in speed of such fan or other actuated device. This, however, is entirely avoided by my variable gearing, as when said wheel 5 has completed three or four revolutions the pinion 39 will have been turned to engage the rack 36 and at each further revolution will shift the position of the friction-wheel 19 to bring same into engagement with the disk 17, nearer the center of same, thereby rendering the power transmitted to said wheel 19 gradually greater to equalize the reduction of power exercised by said spring, and thus automatically maintaining a constant speed on the driven device. For controlling said motor to start and stop the same I provide a bell-crank lever 48, pivotally mounted on the frame and having a bent free end on one arm adapted to project between two teeth of said spur-gear 14 to stop the motor, the free end of the other arm of said lever 48 being pivotally connected with a rod 49 passing through the casing 50.

In transmitting oscillating movement to the fan 33 it will be obvious that at each end of the stroke of the latter the same would be reversed with a jerk which besides being disadvantageous by reason of rapidly causing the working parts to become loose and rattle is also annoying to persons in the room, and by means of the governor or counterweight 34 this jerking uneven motion is entirely obviated, as when the fan 33 is at either end of its stroke the weight 34 is at the middle of its stroke, and vice versa, and thus prevents any change in speed of the working parts.

I claim as my invention—

1. In a spring-motor, the combination with the spring, a counter-shaft, and gearing between said spring and said counter-shaft, said gearing including a friction-disk and a friction-wheel movable toward and away from the axis of said disk to produce variable speed, of devices controlling the relative movements of said disk and said wheel, and means interposed in said gearing for automatically actuating said controlling devices to vary the speed-gearing between said spring and said counter-shaft in accordance with the variations in tension of said spring to maintain substantially constant speed on said counter-shaft, said devices including a rack mounted parallel with and adjacent the shaft on which said friction-wheel is mounted, and movable longitudinally in relation thereto, connection between said rack and said friction-wheel whereby said friction-wheel is moved in unison with said rack, a pinion meshing with said rack, and devices for actuating said pinion at intervals.

2. In a spring-motor, the combination with the spring and a counter-shaft, and gearing between the same, said gearing including relatively adjustable friction devices adapted to vary the speed of said counter-shaft, of devices controlling said friction devices and actuated by a part of said gearing for automatically adjusting the speed of said counter-shaft to accord with variations in tension of said spring to maintain a substantially constant power on said counter-shaft, said controlling devices including a member movable longitudinally in relation to the shaft of one of said friction devices, and connection between said member and said friction device, and devices engaging said member to impart longitudinal movement thereto at intervals.

3. In a spring-motor, the combination with the spring and a driven device, and gearing between the same, said gearing including relatively adjustable friction devices adapted to differentiate said gearing, of devices controlling said friction devices, and located in the path of a part of said gearing to be actuated thereby for automatically adjusting said friction devices to vary said gearing in accordance with the variations in tension of said spring to maintain substantially constant speed and power on said driven device, said controlling devices including a rack mounted adjacent to and paralled with the shaft of one of said friction devices, connection between said rack and said friction device whereby longitudinal movement of said rack will move said friction device along its shaft, a pinion meshing with said rack, a star-wheel rigid with said pinion, and a projection on a rotatable part of said gearing adapted to engage said star-wheel at intervals to rotate same.

4. In a spring-motor, the combination with the spring, a driven device and gearing between said spring and said driven device, said gearing including friction devices relatively adjustable to regulate said gearing to maintain substantially constant speed and power on said motor as the tension of said spring varies, of a rack connected with one member of said friction devices, a shaft carrying a pinion meshing with said rack, and devices on said shaft projecting into the path of a part of the gearing, for imparting movement to said shaft at intervals to alter the position of said member of said friction devices relatively to the other member thereof to vary said gearing.

5. In a spring-motor, the combination with the spring and the driven device, and gearing between the same, said gearing including a friction-disk, and a friction-wheel adjustable toward and away from the axis of said disk to vary said gearing, of a member engaging said friction-wheel, a shaft independent of said gearing, gearing between said member and said independent shaft, a projection on a part of the gearing between said spring and said driven device, and devices on said shaft in the path of said projection adapted to be engaged by the latter to rotate said shaft at intervals to adjust the position of said friction-wheel relatively to said disk, substantially as and for the purpose described.

6. In a spring-motor, the combination with the spring and the driven device, and gearing between the same, said gearing including a friction-disk, and a friction-wheel adjustable toward and away from the axis of said disk to vary said gearing, of a rod engaging said friction-wheel, a rack carried thereby, a shaft independent of said gearing carrying a pinion meshing with said rack, a projection on a part of said gearing, and a star-wheel carried by said independent shaft and lying in the path of said projection and adapted to be engaged thereby to rotate said shaft at intervals, substantially as and for the purpose described.

7. In a spring-motor, the combination with the spring, a driven device, and gearing between the same, said gearing including a friction-disk and a friction-wheel adjustable toward and away from the axis of said disk to vary said gearing, of a rod engaging said friction-wheel, friction devices engaging said rod for holding same against free movement, a rack carried by said rod, a shaft independent of said gearing, a segmental gearing carried by said shaft and meshing with said rack to impart motion to the latter during a given interval to adjust the position of said friction-wheel relatively to said disk, a projection on a part of said gearing and devices carried by said shaft lying in the path of said projection and adapted to be engaged by the latter at intervals to rotate said shaft.

8. In a spring-motor, the combination with the spring and the driven device, and gearing between the same including a friction-disk, a friction-wheel adjustable toward and away from the center of said disk to vary said gearing, a spring holding said disk and wheel in yielding engagement, and devices actuated by said gearing and controlling the movement of said friction-wheel, of a key adapted to engage a part of said gearing for winding up the spring of said motor, and means extending into the path of said key and controlling said yielding engagement of said friction-disk and wheel for releasing same during the interval that said spring is being wound up to permit free adjustment of said friction-wheel.

9. The combination with a motor and an oscillating shaft driven thereby, and gearing between the same, said gearing including a spur-gear on said shaft a reciprocating rack meshing therewith, a crank-shaft on said motor, and connection between said rack and said crank-shaft, of means actuated by said crank-shaft for governing the movements of said oscillating shaft to render same uniform throughout all parts of its stroke.

10. The combination with a motor and an oscillating fan, and gearing between the same, said gearing including a crank-shaft and connection between the same and said oscillating fan for transforming rotary into oscillatory movement, of means for governing such movement to render same uniform comprising a rock-shaft a weighted arm carried thereby, a second crank on said crank-shaft extending at substantially a right angle to the crank connected with said fan and connection between said second crank and said rock-shaft, substantially as described.

In testimony whereof I affix my signature in presence of two witnesses.

CHARLES ADELHELM.

Witnesses:
RUDOLPH WM. LOTZ,
E. F. WILSON.